Dec. 11, 1923.
A. KOWALSKY
1,477,369
METALLIC WHEEL FOR IMPLEMENTS AND VEHICLES
Filed Jan. 7, 1921
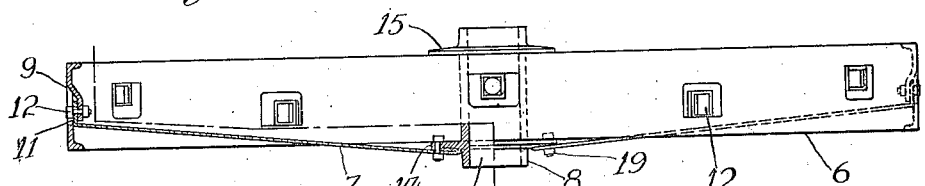
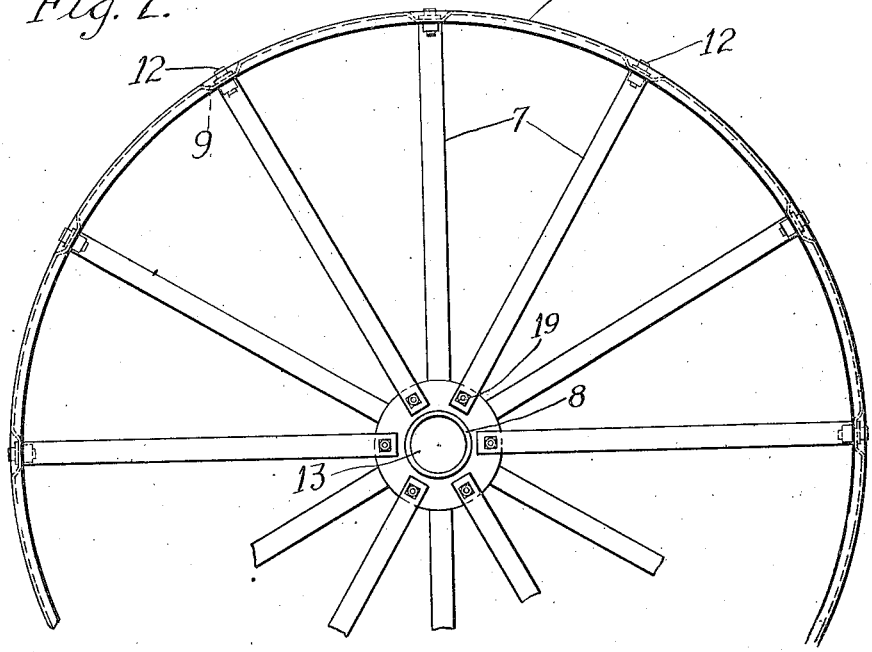
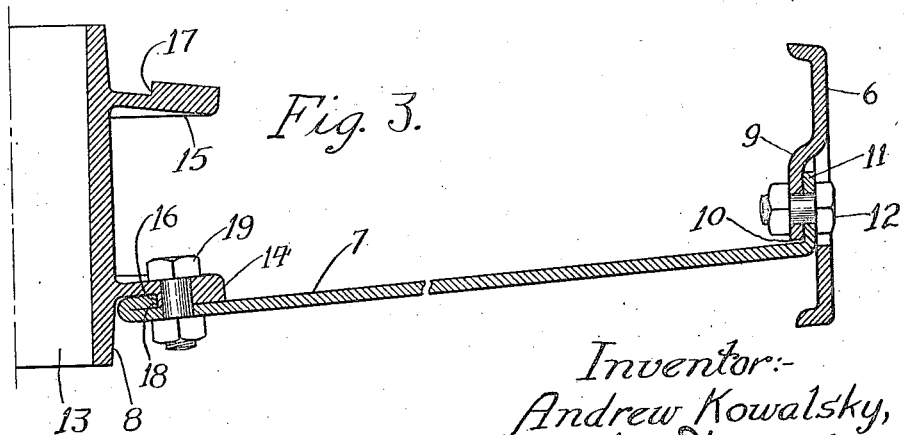
Inventor:-
Andrew Kowalsky,
By H. P. Doolittle
Atty.

Patented Dec. 11, 1923.

1,477,369

UNITED STATES PATENT OFFICE.

ANDREW KOWALSKY, OF OAK PARK, ILLINOIS, ASSIGNOR TO INTERNATIONAL HARVESTER COMPANY, A CORPORATION OF NEW JERSEY.

METALLIC WHEEL FOR IMPLEMENTS AND VEHICLES.

Application filed January 7, 1921. Serial No. 435,687.

*To all whom it may concern:*

Be it known that I, ANDREW KOWALSKY, a citizen of the United States, residing at Oak Park, in the county of Cook and State of Illinois, have invented certain new and useful Improvements in Metallic Wheels for Implements and Vehicles, of which the following is a full, clear, and exact specification.

My invention relates to metallic wheels for use on agricultural implements, vehicles, tractors and the like, and particularly to means for securing the spokes to the rim and hub whereby the tension in the spokes will be transmitted directly to the rim and hub and the securing means relieved of all stress.

In the manufacture of metallic wheels it has been customary to secure the spokes, when made from round stock, to the hub and rim by riveting or heading the ends of the spokes, and when the spokes were made from flat stock to secure them to the rim and hub by rivets or bolts. In the former case the stresses in the spokes due to the load supported by the wheel and road shocks are resisted by the headed or riveted connection of the spokes to the rim and hub, while in the case of flat spokes the stresses come directly on the rivets or bolts. In either case the stresses and shocks soon cause the spokes to work loose with consequent weakening of the wheel and objectionable noises due to the rattling of the loose spokes. It has also been common practice to secure the spokes to the hubs by casting the metal of the hubs around the inner ends of the spokes. But this is objectionable because of the increased expense and the large number of rejected castings resulting from blow holes. Also it frequently happens that the metal of the hub does not adhere closely to the spokes and the latter soon work loose, or the metal may be too hot when poured, which causes the metal of the spokes to be burned and crystallized with consequent breakage when in use.

It is an object of my invention to provide a metallic wheel in which the spokes are secured to the hub and rim in such a manner that the securing means are relieved of all stress and shocks and the spokes will therefore always remain tight.

Another object of my invention is to construct the rim, hub and spokes with cooperating engaging surfaces adapted to receive the stresses due to the load and road shocks.

The above and other objects are attained by means of my invention, as will be evident to those skilled in the art, from the following description when read in connection with the accompanying drawings in which—

Figure 1 is a plan view, partly in section,

Figure 2 is an elevation partly broken away, of a wheel embodying what I now believe to be a preferred form of my invention, and Figure 3 is an enlarged detail view showing the connections of the spokes to the hub and rim.

The wheel consists of an outer rim 6, spokes 7 and a central hub 8. The rim 6 is preferably formed from sheet metal or bar stock welded or riveted together and has a plurality of depressed spoke-engaging lugs 9 integral with the rim and formed by stamping a portion of the metal inwardly. Each lug is joined to the rim on three sides, but is cut free on the remaining side 10 to provide a side opening for receiving the outer bent end or projection 11 of a spoke which fits snugly between the lug and body of the rim. Bolts 12 passing through registering holes in the lugs and spokes prevent disengagement of the latter from the rim.

The hub 8 has a bore 13 adapted to receive the axle of the implement and has two flanges 14, 15, one near each end to which the inner ends of the spokes are secured. The flanges are thickened near their outer edges to provide outwardly facing shoulders or annular abutments 16, 17, which are engaged by shoulders 18 formed by doubling back the ends of the spokes. Bolts 19 inserted in registering openings in the flanges and spokes securely clamp the two together and hold the cooperating shoulders in engagement.

It will be apparent from an inspection of the drawings that the entire load is supported by the spokes in the upper half of the wheel and that the tension in the spokes is transmitted entirely to the flanges 14, 15 and the depressed sections 9 and that none of the load is supported by the bolts 12, 19. It will also be apparent to those skilled in the art that I have overcome the defects existing in former metallic wheels and have provided a wheel that is strong and durable, cheap to manufacture and easy to assemble.

While I have shown but one embodiment of my invention and have described it as being made preferably from certain materials, I wish it to be understood that I am not limited thereto, since the invention is capable of many modifications and different materials may be used in its construction such, for example, as cast iron for the rim 6.

Having thus described my invention, what I claim as new and desire to secure by Letters Patent is:

1. A wheel having a rim, spokes secured to the rim at their outer ends, a hub having an annular flange, the inner ends of the spokes being doubled back to provide shoulders engaging the flange on the hub and means for maintaining the shoulders in engagement with the flange.

2. In a wheel, the combination of a rim, having a plurality of projections on its inner periphery, a hub having an outwardly facing annular shoulder, and a plurality of spokes having means on their outer ends to engage the projections and means on their inner ends to engage the annular shoulder whereby the stresses due to the load are transmitted directly from the hub to the rim thru the spokes.

3. In a wheel, the combination of a rim having a plurality of depressed sections, a hub having a projecting flange, an annular shoulder on the flange, and spokes having projections at their outer ends engaging the depressed sections on the rim and shoulders at their inner ends engaging the annular shoulder on the hub.

4. In a wheel, the combination of a rim, having a plurality of projections on its inner periphery, a hub having an outwardly facing annular shoulder, a plurality of spokes having means on their outer ends to engage the projections and means on their inner ends to engage the annular shoulder whereby the stresses due to the load are transmitted directly from the hub to the rim through the spokes, and means securing the spokes to the projections and shoulder.

5. In a wheel, the combination of a rim having a plurality of depressed sections, a hub having a flange, an annular shoulder on the flange, spokes having projections at their outer ends engaging the depressed sections on the rim and shoulders at their inner ends engaging the annular shoulder on the hub, means for holding the projections in engagement with the depressed sections, and means for maintaining the shoulders on the spokes and hub in engagement.

6. A metallic wheel having an outer rim, inwardly depressed sections on the rim having side openings in one side only, spokes having extensions on their outer ends engaging in said side openings, a hub, and means for securing the inner ends of the spokes to the hub.

7. A metallic wheel having an outer rim, depressed sections on the rim having openings in one side only, spokes having lateral extensions engaging in said openings, means for securing the extensions in said openings, a hub, and means for securing the inner ends of the spokes to the hub.

8. A metallic wheel having a rim, spokes secured at their outer ends to the rim, a hub having radially extending flanges, outwardly facing annular shoulders on the flanges, inwardly facing shoulders on the inner ends of the spokes engaging the shoulders on the flanges, and means for maintaining the shoulders in engagement.

9. A metallic wheel having a rim, spokes secured to the rim at their outer ends, a hub having a plurality of shoulders, the inner ends of the spokes being doubled back to provide shoulders engaging the shoulders on the hub, and means for maintaining the shoulders in engagement.

10. A metallic wheel having an outer rim, stamped out sections on the rim having openings therein, spokes having extensions at their outer ends engaging in the openings, a hub having radially extending flanges, annular shoulders on the flanges, shoulders on the inner ends of the spokes engaging the shoulders on the flanges, and means for maintaining the shoulders in engagement.

11. A metallic wheel having a rim, depressed sections on the rim having side openings and spaced from the inner periphery of the rim, spokes having lateral extensions extending through the side openings and engaging the depressed section and the inner periphery of the rim, a hub having a plurality of annular shoulders, the inner ends of the spokes being bent back to provide shoulders engaging the shoulders on the hub, and means for securing the respective ends of the spokes in engagement with the rim and hub.

In testimony whereof I affix my signature.

ANDREW KOWALSKY.